Oct. 6, 1959 A. G. COOLEY 2,907,826

AUTOMATIC PHASING CONTROL FOR FACSIMILE RECORDERS AND THE LIKE

Filed Jan. 18, 1957 2 Sheets-Sheet 1

INVENTOR
AUSTIN G. COOLEY
BY John J. Rogan
ATTORNEY

AUTOMATIC PHASING CONTROL FOR FACSIMILE RECORDERS AND THE LIKE

Filed Jan. 18, 1957

2 Sheets-Sheet 2

INVENTOR
AUSTIN G. COOLEY
BY John J. Rogan
ATTORNEY 2,907,826

AUTOMATIC PHASING CONTROL FOR FACSIMILE RECORDERS AND THE LIKE

Austin G. Cooley, New York, N.Y., assignor, by mesne assignments, to Digital Control Systems, Inc., Beverly Hills, Calif., a corporation of California Application January 18, 1957, Serial No. 635,019

10 Claims. (Cl. 178—69.5)

This invention relates to systems and apparatus for bringing two independently driven rotating members into corresponding positional phase relation, and more particularly to automatic systems and apparatus for phasing a facsimile recorder with a facsimile transmitter.

In general terms the object of the invention is to provide an improved phasing mechanism of the character described, which is simple and reliable in construction, and designed to function without attention or intervention by an attendant.

Another object of the invention is to provide an improved phasing mechanism which operates in response to a single phasing pulse from the transmitter and does not require use of a slip clutch or similar device between the driven member and its driving motor.

Another object of the invention is to provide a facsimile phasing system in which the scanning mechanism of a transmitter and the recording mechanism of a receiver normally operate at the same speed, and having improved means for changing the phase relationship between the transmitter and recorder scanning mechanisms by means of a single pulse phase sensing device.

Other objects and advantages of the invention will appear from the following description of the preferred embodiment thereof shown in the accompanying drawings, wherein—

Figure 1:
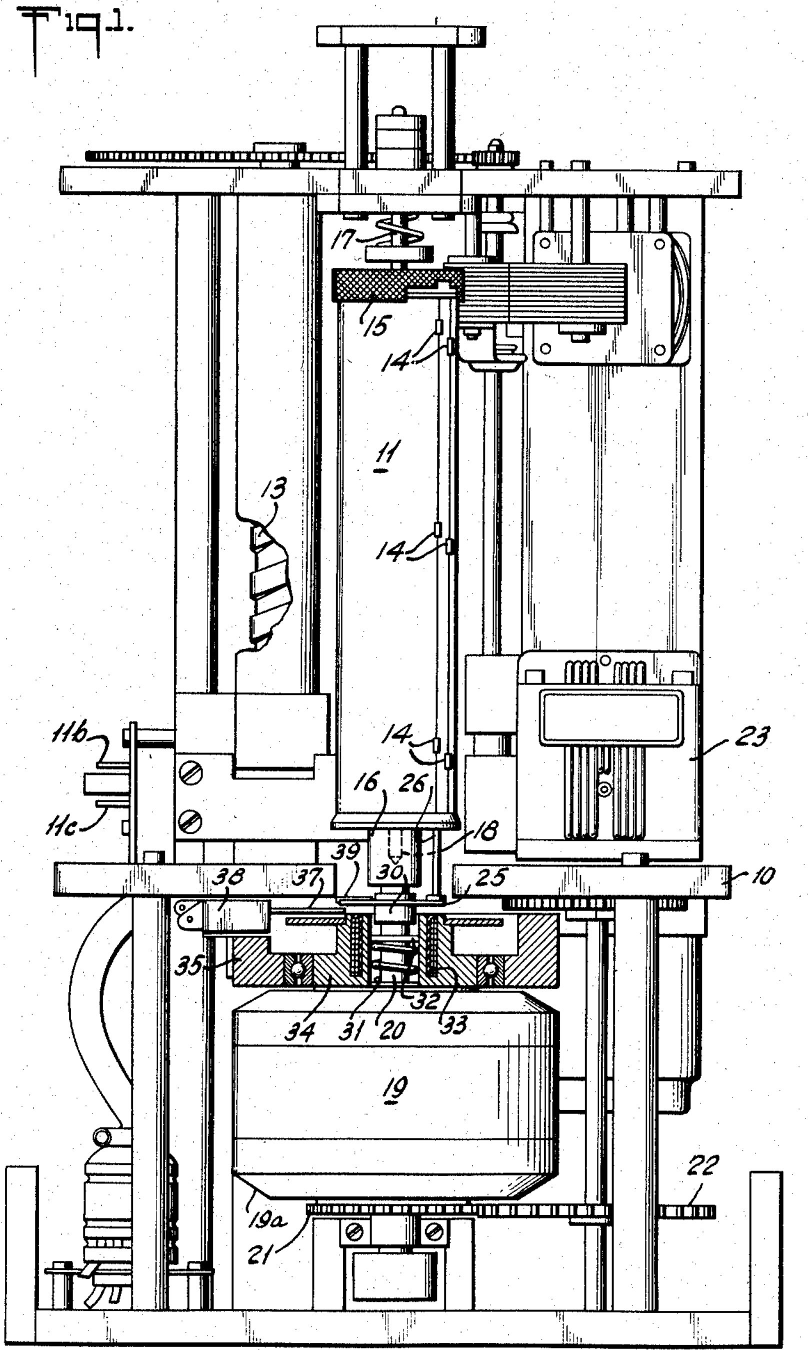
Fig. 1 is a front elevational view of a recorder embodying the invention.
Figures 2, 3, 4A, 4B, 5:
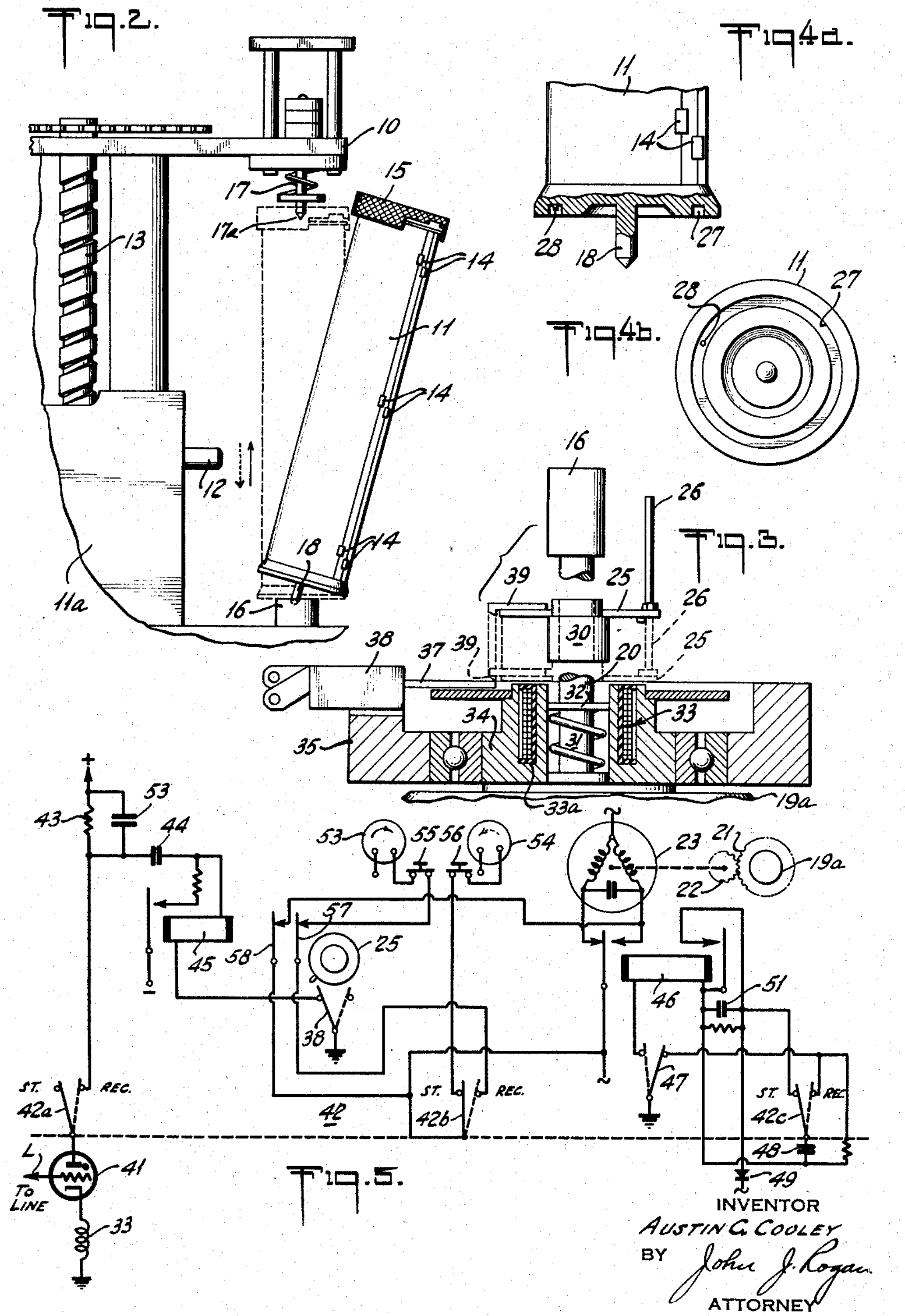
Fig. 2 is a side elevational view of part of the recorder of Fig. 1.
Fig. 3 is an exploded detailed view on an enlarged scale, partly in section, of the phasing mechanism of the recorder of Fig. 1.

Fig. 4*a* is an elevational view of the lower end of the recorder drum of Fig. 1;

Fig. 4*b* is a bottom view of Fig. 4*a*;

Fig. 5 is a schematic circuit diagram of the control apparatus of the recorder shown in the preceding figures.

In the following description of the invention, reference will be made to a facsimile transmission system which represents the most important application of the invention. Such systems generally involve scanning and recording mechanisms which are driven at the same speed by respective synchronized drive motors, as well known to those skilled in the art. In securing phase correspondence of the scanning and recording mechanisms, it is the common practice to send to the recorder a phasing pulse or a series of such pulses from the transmitter, which pulses are utilized to position or spatially phase the recording mechanism to correspond with the position or spatial phase of the scanning mechanism of the transmitter. In the usual facsimile system which is designed to achieve phasing by means of a single pulse, the phasing pulse releases the latch-held recording mechanism, the said mechanism being driven from its respective motor through a slip friction clutch mechanism. Such latching and clutch mechanisms have certain drawbacks which are avoided by the use of the present invention.

In accordance with the invention, the rotating drum of the recorder mechanism, which carries the recording sheet or film, is driven directly or through gearing from its respective synchronous drive motor without interposing a slip clutch for phasing. Furthermore, provision is made for positioning the recorder drum during the phasing operation, while the shaft of its drive motor continues to rotate at synchronous speed. A separate rotatable phasing member is positively driven by the drum prior to the phasing operation. When the recording mechanism is started, the rotatable phasing member assumes a predetermined angular relation to a fixed point on the record sheet, for example the location of the sheet clamps on the drum, so that the position of the phasing member represents the phasing error in the position of the drum at the instant the phasing pulse is received. At that instant the phasing member is disengaged from the recorder drum and is magnetically attached or fastened to the frame or stator of the synchronous driving motor. Therefore its angular position with respect to the axis of the motor registers the difference in phase between the transmitter scanning mechanism and the recorder drum. The motor frame is then automatically rotated until this phase difference is reduced to zero.

The operation of the phasing mechanism is fully automatic, once the recorder mechanism is started and the phasing mechanism prepared for the phasing pulse. The phasing mechanism according to the invention has the further advantage that the drive connection between the drum which carries the recording sheet and the synchronous driving motor is a direct connection without any slip clutch which would require considerable additional power from the synchronous motor for its operation. In its preferred form, the phasing system according to the present invention does not require any power from the synchronous drive.

Referring to the drawings, as shown in Figs. 1 and 2, the recorder comprises a frame 10 carrying the rotatable drum 11 and the associated recording mechanism. The recording mechanism may comprise a conventional scanning head **11*a* including a facsimile signal responsive lamp whose base contacts are designated 11*b*, 11*c* (Fig. 1) and optical system 12 (see Fig. 2) which is moved longitudinally parallel to the rotational axis of the drum 11 by means of a suitable lead screw 13, as well known in the art. For convenience in loading the recording sheet on the drum, the drum 11** is shown as detachable so that it may be removed as indicated in Fig. 2.

Clamping members 14 of any well known kind on the drum serve to hold the recording sheet or film in place. The drum 11 is provided with a free-turning knurled collar 15 which provides a finger hold for grasping the drum without interfering with the rotation thereof when placed in operating position. When mounted in place for recording, the drum 11 is supported by the rotating drive member 16. The drum 11 is held against the lower supporting member 16 by means of the resiliently mounted thrust plunger 17 at the upper end of the frame 10, said plunger having a tip **17*a* which fits into a centrally located socket in the upper end of the drum. The synchronous drive motor 19 for rotating the recorder drum at synchronous speed has a vertical shaft 20 which carries the supporting collar 16 at its upper end for supporting the bottom of the drum. The lower end of drum 11 carries a central pointed rod 18 which registers with a corresponding central socket in collar 16. The drum is turned by frictional engagement with said collar. The frame or stator 19*a* of the synchronous motor 19 is supported in suitable bearings so that the said frame can be turned about its vertical axis in order to effect phasing of the drum while the drum is rotating. The rotation of the frame of the drive motor 19 may be effected in any suitable manner by a second or auxiliarly motor. As shown in Fig. 1, a gear 21 is attached to the frame, said gear meshing with a gear 22 driven by an auxiliary motor 23 attached to the stationary main frame 10. The motor 23 is energized momentarily during the phasing operation to turn the stator 19***a* of motor 19 at any non-synchronous speed until the drum is in phase correspondence with the remote scanning mechanism, as will be described.

Referring particularly to the detailed views, Figs. 3, 4*a* and 4*b*, the upper end of the motor shaft 20 carries a rotatable phasing member or plate 25 below the sleeve 16. The phasing member 25 is provided with an upstanding pin or lug 26 adapted to ride in the circular groove 27 in the lower end of the drum 11. A small pin or projection 28 at one point in the groove 27 is adapted to be engaged by the end of the vertical pin 26 of the phasing member at a predetermined angular position with respect to the clamps 14. The phasing plate 25 is carried by a sleeve 30 which has a clearance hole for the shaft 20 of the motor so that the sleeve turns freely on the shaft. The sleeve 30 is pressed upwards against the collar 16 on the motor shaft by means of a spring 31 and washer 32. When the pin 28 on the drum engages the upstanding pin 26 on the phasing member 25, the drum turns the phasing member until the phasing pulse is received. Since the pin 28 on the drum is in a predetermined angular relation to the clamping members 14 at the edge of the recording sheet, the phasing member 25 assumes a predetermined position in relation to the desired phasing position of the drum 11.

The phasing member or plate 25 also constitutes the retractible armature of an electromagnet 33 and is therefore made of magnetizable metal. As shown in Fig. 3, the coil 33*a* of the electromagnet is disposed in the rotatable core 34 which is journaled in the stationary support 35 and turns as a unit with the frame of the synchronous motor 19. Normally the spring 31 holds the phasing member 25 above the face of the electromagnet 33 and in a position where the pin 28 on the drum engages the pin 26 of the phasing member, as shown in the full-line relation in Fig. 3. For clearness, Fig. 3 is an exploded view, and does not show the actual relation of the elements 11, 16, 25 and 33 in the axial direction. When the phasing pulse is received the rotatable phasing member 25 is attracted by the electromagnet 33 and drawn down into contact with the face of the core 34, as shown in dotted lines in Fig. 3. In this position the pin 26 carried by the phasing member is disengaged from the pin 28 carried by the drum and the phasing member is mechanically connected to the frame of the motor 19 for rotation as a unit therewith. Thus the angular position of the phasing member 25 at the time the phasing pulse is received indicates the displacement of the drum 11 from the desired phasing position with respect to the transmitter. By automatically rotating the drum through a predetermined angular movement with respect to the synchronous scanning mechanism at the transmitter, the desired phase correspondence between the recording drum and the transmitter scanning mechanism may be obtained.

In order to accomplish this, the drum is rotated by automatically rotating the frame or stator 19*a* of the synchronous motor 19. During the time that the frame 19*a* is being turned to effect phase correspondence of the recording and scanning mechanisms, the phasing member 25 is turning with the motor frame 19*a* and the supporting core 34, to which the member 25 is frictionally coupled by the electromagnet 33. When the phasing member 25 reaches a predetermined position, the recording drum 11 will be in the desired phase relation to the transmitter scanning mechanism. At this point the rotation of the frame 19*a* of the motor 19 is stopped. For example this may be accomplished by positioning the operating member 37 of a stationarily mounted microswitch 38 so that it will be engaged by a projecting lug 39 on the phasing member 25. Thus the closure of the switch 38 may effectuate the opening of the circuit of the motor 23 which is geared to the casing 19. However, other suitable means may be employed to rotate the drum 11 to its correct phase position.

It should be noted that the contacts of microswitch 38 are normally closed and they are not opened until the lug 39 on the phasing device 25 momentarily engages the operating arm 37 of the switch. Furthermore, the switch 38 is fixedly mounted on the frame of the machine in a predetermined relation with respect to the normal position of the optical system 12, so that when the contacts of switch 38 are opened by the projection 39, it is an indication that the drum 11 is in the proper phase relation with respect to the said optical system and is therefore in the same phase relation with respect to the transmitting drum.

The control circuits for starting and phasing the recorder are shown in Fig. 5. Wherever possible the parts shown in Fig. 5 which are identical with those of the preceding figures, bear the same designation numerals. Referring to Fig. 5, the circuit includes a triple tongue ganged control switch *42a*, *42b*, *42c*, with Standby and Receive positions marked ST and REC. The switch 42 may be a manually operated switch or it may be constituted of the contacts of a relay in a fully automatic system. When the operator desires to receive a facsimile transmission, the loaded drum 11 bearing the sensitized film or recording sheet is mounted in place as in Fig. 1. When transmission starts, the control switch 42 is actuated to REC position. The synchronous drive motor 19 may operate continuously but actual indexing movement of the optical system 12 and recording drum do not start until switch 42 is operated to REC; however the control switch is preferably interlocked with the drum mounting mechanism so that when the drum is lifted out of its socket at the end of the reception period, as indicated in Fig. 2, the switch is automatically reset to standby position ST.

When the phasing pulse is received from the remote transmitter, the drum 11 is rotating and the pin 26 on the phasing member 25 is in engagement with the pin 28 on the drum, thus indexing and locating the phasing member with respect to the clamping members 14 at the edge of the recording sheet. The transmission line L from the transmitter being connected to the grid of a thyratron tube 41, the received phasing pulse fires the tube. The current through the phasing magnet 33 in series with the tube 41 energizes that magnet. The phasing member 25 is attracted by the magnet and, as described above, is disengaged from the pin 28 on the drum and thus registers the angular position of said pin at the instant the phasing pulse is received. The circuit of the magnet 33 includes the tube 41, the contact 42*a* of the control switch and resistor 43 with its by-pass capacitor 53. As stated above, all of the contacts 42*a*, 42*b*, 42*c* of the control switch are in the REC position during the recording. When the tube 41 fires, the discharge of the capacitor 44 produces a pulse of current through the winding of relay 45 and this relay locks up through its left hand armature and front contact to the grounded terminal of a battery or other direct current supply, which ground is controlled by the micro-switch 38. As pointed out above, the contacts of switch 38 are normally closed, thus preparing a locking circuit for the relay 45. However, when the drum 11 reaches the proper phased position with respect to the optical system 12, the switch 38 is opened, thus breaking the locking circuit of relay 45 which remains deenergized.

The operation of relay 45 starts the reversible motor 23 which, as above described, turns the frame or stator 19*a* of synchronous motor 19 for phase correction, the motor 23 being energized when the short-circuit across its windings is opened at the inner right hand armature and back contact of relay 45. This in effect changes the phase of the rotor of motor 19 without affecting its synchronous speed. However this change of phase of the motor rotor adds an increment of speed to the drum 11 sufficient to bring the drum into proper phase relation with respect to the optical system 12 and therefore in the proper phase relation with respect to the corresponding scanning equipment at the transmitter. The motor 23 may be a capacitor start-run motor of the induction type, as indicated, which may be reversed by switching terminal connections as illustrated by way of example at the make-and-break contacts of relay 46. By reversing the direction of rotation of the motor 23, the stator of synchronous motor 19 may be returned to a normal or "home" starting position between transmissions, thus permitting the use of a flexible power cable for supplying the high voltage windings without slip rings, since stator 19 need not make more than a 360° turn to effect phasing.

The change of phase of the stator of motor 19 as described, correspondingly changes the phase of the recorder drum 11 until the drum reaches the position of phase correspondence with the remote scanner. At this time, the phasing member 25 stops the auxiliary motor 23, as by opening the switch 38 (Figs. 3 and 5). The opening of the normally closed contacts of switch 38 interrupts the circuit of relay 45 and this relay becomes deenergized. The relay 45 stops motor 23 quickly, due to the braking action of the short circuit across the motor windings through the inner right hand contacts of the relay.

Associated with the stator **19*a* is a set of off-normal contacts 47, the movable element of which remains in its full line position so long as the stator 19*a* is in its "home" position. When the stator 19*a* is turned from its normal "home" position, the movable contact 47 is actuated to the position shown in dotted lines. At the end of copy reception, the control switch 42 is actuated to standby position ST. The resulting charge current through capacitor 48 and contacts 42*c* operates relay 46 and this relay locks up through its right hand make contact and rectifier 49. Relay 46 at its left hand armature reverses the motor 23 to return the stator of motor 19 to the "home" position, where contact 47 operates to deenergize the relay 46 and stop the motor 23**. The recorder is now ready for the next transmission.

The rotation of motor 23 will be reversed to return the stator of motor 19 to the "home" position, if away from that position, when the power is turned On with the control switch in either the ST or REC position. If the switch is in the ST position, the charging current of capacitors 48 and 51 will operate relay 46; if in REC position, the relay will be operated by the charging current of capacitor 51.

Motors 53 and 54 are the forward feed and return motors for driving the indexing screw 13 for the scanning head **11*a*. The forward motion of the scanning head 11*a* is indicated by the full line arrow in Fig. 2, and the return motion is indicated by the dotted line arrow. Likewise, in Fig. 5, the forward driving motor 53 is rotated in the direction of the full line arrow and the return motor 54 rotated in the opposite direction as indicated by the dotted line arrow. Each of the motors 53 and 54 is provided with a respective limit switch 55, 56 so that when the scanning head 11*a* reaches the end of its traverse in either direction, the respective motor circuit is automatically opened. It will be observed that during the phasing operation, that is, when relay 45 is locked, the circuit for the forward driving motor 53 is open at contact 57 and, of course, the circuit of the return motor 54 is also open at the contact 42*b***.

After the automatic phasing operation has been completed as above described, relay 45 releases and closes the circuit of the forward motor 53 since the switch arm **42*b* is in the REC position. At the end of the transmission the switch arm 42*b* is moved to its ST position and the circuit of return motor 54 is closed. It will be understood, of course, that the forward motor 53 is synchronized with the corresponding scanning element at the transmitter in any manner well known in the facsimile synchronizing art. Connections including the limit switches 55 and 56 are shown by way of example to provide for advancing the scanning head 11*a* by actuation of the control switch to REC position through contact 42*b*, and returning it to the initial position in readiness for the next transmission when the switch is actuated to standby position ST through contact 42*b***.

It will be evident that in accordance with the invention the phasing mechanism is small, simple and fully automatic, requiring no manual operation or attention. The disadvantages of conventional phasing systems involving clutches, dual motors and speed changing devices are overcome.

While I have described a preferred embodiment of the invention for the purpose of explaining the operating principles thereof, it will be apparent to those skilled in the art that various modifications may be made without departing from the scope of the invention.

What is claimed is:

1. Phasing apparatus for facsimile systems and the like comprising, in combination, a rotatable member to be brought into phase correspondence with a remote mechanism, a rotatable phasing device adapted to rotate with said member or to be disengaged from said member, means effective upon receipt of a phasing impulse from the remote mechanism for disengaging said phasing device from said member to positionally register the desired phase of said member, a synchronous drive motor for synchronously rotating said member, said motor having a rotor and an independently rotatable stator, means for rotating the said stator for phasing, means for selectively coupling said phasing device to said stator whereby said rotatable phasing device is rotated as a unit with said stator, and means for terminating the rotation of said stator when said phasing device is turned to a predetermined position wherein the said member is in the desired phase correspondence with said remote mechanism.

2. In a phasing mechanism for facsimile machines and the like, the combination of a first rotatable member to be brought into phase correspondence with a second independently rotatable member, means associated with said second member for generating a phasing pulse, a rotatable phasing device associated with the first member, a drive motor for said first member having a rotatably mounted stator, means for causing said rotatable phasing device to rotate with said first member, means responsive to a phasing impulse for arresting the rotation of said phasing device to register the phasing error between said members but without arresting the synchronous rotation of the said first member, and means including said phasing device to rotate the stator of the drive motor to effect phase correspondence of both said members.

3. An automatic phasing mechanism for facsimile systems and the like for bringing a rotatable member at a receiving point into predetermined angular phase coincidence with a rotatable member at a transmitting point, comprising at the receiving point means to receive a phasing impulse from the transmitting point, a synchronous motor for the first-mentioned member and having a rotor coupled to said member to drive it at synchronous speed, said motor having a stator which is rotatably mounted to change the phase relation of its rotor, a phasing device which is shiftable into and out of rotational driving relation with said first-mentioned member, means responsive to a received phasing impulse transmitted from said transmitting point to shift said device out of driving relation with said first-mentioned member to stop said phasing device and for coupling it to said stator and thereby to positionally register the phase of said device by its stopped position with respect to said first-mentioned member while the latter continues rotating at synchronous speed, means effective so long as there is a phase difference between said first-mentioned member and said positional registration of said device to rotate said stator and device until said difference is substantially reduced to zero, and means effective when said difference is so reduced to disconnect said device from said stator and to stop rotation of said stator.

4. An automatic phasing mechanism for facsimile machines and the like comprising a rotatable member to be phased with another member by a transmitted phasing impulse controlled by said other member, a synchronous motor having a rotor and a stator, the shaft of the rotor being coupled to said first-mentioned member to drive it at synchronous speed, a phasing device mounted for shifting movement between said motor and said first member, said device also being normally freely rotatable around said shaft, said device being rotated in one of its shifted positions by engagement with said first member and being rotated in another shifted position by engagement with said stator, said stator being mounted for independent rotation, electromagnetic means controlled by a received phasing impulse to control the shifting of said device, and circuit connections effective as long as there is a phase difference between said members to maintain said device coupled to said stator and for rotating said stator.

5. An automatic phasing mechanism according to claim 4, in which said phasing device comprises a sleeve which is slidably mounted on the said rotor shaft, said sleeve having a projection which is arranged to engage a corresponding projection on the first member so as to be driven thereby, means normally urging said sleeve to bring said projections towards each other, and said electromagnet means includes a solenoid winding and a magnetic armature attached to said sleeve.

6. An automatic phasing mechanism according to claim 5, in which said solenoid winding has an energizing circuit controlled by a stationary mounted switch, said switch having an operating element located in the path of rotation of said phasing device only when said phasing device is being driven by said stator.

7. An automatic phasing mechanism according to claim 6, in which the circuit for said solenoid winding includes a locking relay which is initially operated by the received phasing impulse, and means effective when said members are in phase to break the locking circuit of said relay.

8. An automatic phasing mechanism according to claim 7, in which a separate motor is provided for driving said stator, the circuit for said separate motor being controlled through contacts of said locking relay.

9. Automatic phasing apparatus for facsimile systems and the like, comprising a facsimile recorder having a rotatable drum which is to be rotationally phased with a corresponding drum at a facsimile transmitter, a synchronous motor having a rotatable stator and a rotor, said rotor being coupled to the recorder drum to drive it at synchronous speed, a recording head for the recorder, lead screw means driven by said synchronous motor to index said head along the axis of the recorder drum, a rotatable phasing control device, an electromagnet for selectively shifting the phasing device to couple it either to the recorder drum or to said stator, means to drive said device and the recorder drum prior to receipt of a phasing impulse, and means effective when the drums are out of phase and responsive to a received phasing impulse to couple said phasing device to said stator and to maintain it so coupled.

10. Automatic phasing apparatus for facsimile systems and the like, comprising a facsimile recorder having a rotatable drum which is to be rotationally phased with a corresponding drum at a facsimile transmitter, a synchronous motor having a rotatable stator and a rotor, said rotor being coupled to the recorder drum to drive it at synchronous speed, a recording head for the recorder lead screw means driven by said synchronous motor to index said head along the axis of the recorder drum, a rotatable phasing control device, an electromagnet for selectively shifting the phasing device to couple it either to the recorder drum or to said stator, means to drive said device and the recorder drum prior to receipt of a phasing impulse, means effective when the drums are out of phase and responsive to a received phasing impulse to couple said phasing device to said stator and to maintain it so coupled, and means for turning said rotatable stator to change the phase of said rotor.

References Cited in the file of this patent

UNITED STATES PATENTS

| | | |
|---|---|---|
| 2,495,828 | Spencer | Jan. 31, 1950 |
| 2,779,820 | Weld | Jan. 29, 1957 |